US005497485A

United States Patent [19]
Ferguson et al.

[11] Patent Number: 5,497,485
[45] Date of Patent: Mar. 5, 1996

[54] METHOD AND APPARATUS FOR IMPLEMENTING Q-TREES

[75] Inventors: David E. Ferguson; Eduardo C. Ross, both of Fawnskin, Calif.

[73] Assignee: Amalgamated Software of North America, Inc., Big Bear Lake, Calif.

[21] Appl. No.: 65,657

[22] Filed: May 21, 1993

[51] Int. Cl.⁶ .................................................. G06F 17/30
[52] U.S. Cl. ............................................................. 395/600
[58] Field of Search ...................................... 395/600, 425

[56] References Cited

U.S. PATENT DOCUMENTS

| | | | |
|---|---|---|---|
| 4,677,550 | 6/1987 | Ferguson | 395/600 |
| 5,121,493 | 6/1992 | Ferguson | 395/600 |
| 5,202,986 | 4/1993 | Nickel | 395/600 |
| 5,274,805 | 12/1993 | Ferguson et al. | 395/600 |

OTHER PUBLICATIONS

A. K. Chandra & D. B. Lomet "Digital B–Trees" IBM Technical Disclosure Bulletin vol. 25, No. 1, pp. 106–109, Jun. 1982.
D. Comer "The Ubiquitous B–Tree" Computing Surveys, vol. 11, No. 2, pp. 121–136, Jun. 1979.
A. Toptsis "B**–Tree: A Data Organization Method for High Storage Utilization" IEEE 1993 Int'l Conf. Computing and Info., pp. 277–281, 1993.
A. Toptsis "B***–Tree: A Family of Efficient Data Packaging Multiway Trees" IEEE 1993 Int'l Conf. Computing and Info., pp. 282–286, 1993.
Ferguson, "Bit–Tree: A Data Structure for Fast File Processing," Communications of the ACM, Jun. 1992, vol. 35, No. 6, pp. 114–120.

Primary Examiner—Thomas G. Black
Assistant Examiner—Peter Y. Wang
Attorney, Agent, or Firm—Fish & Richardson

[57] ABSTRACT

A method and apparatus for increasing the speed of a search through leaf nodes of an inventive key index tree structure, known as a "Q-tree". The present invention identifies "decision-bits" within leaf node entries and uses these decision-bits to accelerate searches for a particular record or for a record adjacent to which a new record is to be inserted. A decision-bit is a particular type of distinction-bit having the smallest value and associated with a search key a greater value then the keys associated with other distinction-bits of the same value within a specified search range. Each decision-bit divides a search range into "left" and "right" parts. One of the two parts will constitute a "new" search range. A "quit-bit" having an ordinal number equal to the value of the decision-bit for the search range, is tested. If the quit-bit is "on", then the right, or greater value, part becomes the new search range. Otherwise, the left, or lesser value, part becomes the new search range. A decision-bit pointer which identifies the relative location of a "root" decision-bit is placed in a predetermined location within the prologue of each leaf node. Additional decision-bit pointers are associated with each subsequent decision-bit within the leaf node and indicate the relative location of such decision-bits with respect to the root decision-bit.

8 Claims, 12 Drawing Sheets

METHOD AND APPARATUS FOR IMPLEMENTING Q-TREES

BACKGROUND OF THE INVENTION

1. Field of the Invention

This invention relates to a method and apparatus for indexing data in a computer system, and more particularly to a method and apparatus for reducing the time required for searching data in a computer data storage system by using a key index tree structure.

2. Description of Related Art

In the computer arts, data is stored in a storage system having storage devices, such as magnetic disks. For very large databases, it is extremely inefficient and time consuming to search all data records in the storage system in order to find a particular record. A more efficient method is to create a search key for each data record that uniquely identifies the record. Each search key is associated with a data pointer that indicates the location in the computer storage system of the data record associated with the search key. A common type of pointer is a relative record number. Through the use of such pointers, the data records themselves need not be kept in sequential order, but may be stored in random locations in the computer storage system. A search for a particular data record is accelerated by sequentially searching a compiled index of such search keys, rather than the data records themselves. However, this method is still rather inefficient and time consuming.

A much more efficient search method for such an index is to create a tree structure, rather than a sequential file, for the search keys. One such tree structure is a "B-tree". The use of B-trees to structure indexes for data files in computer data storage systems is well known in the prior art. (See, for example, Knuth, *The Art of Computer Programming*, Vol. 3, pp. 473–479). A B-tree consists of nodes which can be either leaf nodes or branch nodes. A branch node contains a search key and associated pointers (such as relative record numbers) to other branch nodes and/or leaf nodes. A leaf node contains search keys and pointers to data records. One node in the tree is the root node, which can be either a leaf node (only for a tree with a single node) or, more generally, a branch node. In both branch and leaf nodes, the number of pointers is always one greater than the number of search keys. The "height" of a tree is equivalent to the longest number of branch paths from the root node to the leaf nodes.

In the most simple B-tree, each node contains one search key and two associated pointers. Such a tree structure, sometimes referred to as a binary tree, theoretically provides a very efficient search method. If the number of nodes in this type of tree is equal to, or less than $2^n$, then only "n" searches are required to locate a data record pointer in any leaf node.

Typically, most databases are stored on relatively slow storage devices, such as magnetic disks. The time required to access any item of data (such as a tree node) on such a storage device is dominated by the "seek" time required for the storage unit to physically locate the desired storage address. Following each seek, the contents of a node may be read into the high-speed memory of the computer system. In a simple binary tree, for each access of a node, only a two-way decision (to the left or right branch from that node) can be made since the node contains only one search key.

If, instead of containing only one search key per node, a node contains several search keys, then for each storage device seek operation, several keys will be read into the high speed memory of the computer system. With one search key per node, a comparison and determination can be made that the item sought for is in one half of the remainder of the tree. With "n–1" search keys per node, the search can be narrowed to "1/nth" of the remainder of the tree. This type of structure is known in the prior art as a "multi-way" tree.

For the purpose of limiting the number of accesses to the storage system, it is generally advantageous to have as many search keys as possible per node. Thus, for each seek that reads a node, several search keys can be examined sequentially and a more efficient determination can be made as to the location of the next node, or data record in the case of a leaf node. The height of the tree, and hence the search time in storage systems with relatively slow access speeds, is dramatically decreased if the number of search keys per node is increased. However, especially in high speed data storage devices presently available, there is a point at which the time required to search sequentially through a node becomes substantial with respect to the time required to access an item of data.

An example of a system in which a number of keys are stored in each branch and leaf node is a database system that operates on the IBM System/34 computer. In that system, each node is 256 bytes long, corresponding to that computer system's magnetic disk sector size. In this example computer system, the key length is up to 29 bytes. Using 3-byte relative record numbers for pointers, the maximum number of search keys that can be inserted into each node of that system is eight. For that computer system, it is advantageous to have a search tree structure that contains more than eight search keys per node.

A system which provides such a tree structure using a variation of the B-tree called a "Bit-tree" is described in U.S. Pat. No. 4,677,550, assigned to the assignee of the present invention. A Bit-tree is similar to a B-tree in that it consists of leaf nodes and branch nodes, with one of the nodes in the tree being the root node. Branch nodes are essentially identical to branch nodes in a standard B-tree. Typically, the root node is not larger than any other branch node. In one such system, each node is 256 bytes long, and the system uses 3-byte relative record numbers for pointers. Thirteen bytes per node are used for system information purposes. The remaining 243 bytes of each node can be used for search keys and their associated relative record numbers. Under this system, if "k" is the length of a search key, and each search key is associated with a 3-byte relative read number, then the maximum number of search keys per node is (256-13)/(k+3). As implemented in the IBM system/34 computer, the maximum number of maximum length search keys per branch node is therefore seven (k=29 bytes).

The principal difference between a Bit-tree and a standard B-tree is the use of "distinction-bits" in place of search keys in all leaf nodes. A distinction-bit is determined by comparing two adjacent search keys, and calculating the ordinal number of the highest order bit that is different between the two keys. (In the '550 invention, the binary number "1000" is added to each distinction-bit in order to simplify the search method). If the maximum search key length permitted is 29 bytes, and there are eight bits per byte, the maximum length of a search key is 232 bits. Thus, the ordinal number representing any one of those 232 positions need only be eight bits, or one byte, in length (even taking into account the 8-count displacement added into each distinction-bit).

Distinction-bits along with their associated relative record numbers are inserted in each leaf node instead of search keys. The maximum number of one-byte distinction-bit entries plus relative record numbers in such a leaf node is therefore 243/(1+3), or 60, for keys with length of 29 bytes. This use of distinction-bits is the principal advantage of Bit-trees. Because each branch refers to dozens of descendant nodes, almost all nodes in a tree structure are leaf nodes. Since Bit-tree leaf nodes contain more entries than nodes containing standard search keys, there are fewer nodes in the tree to seek and read. Further, less storage space is required for the tree itself, since more information is packed into fewer leaf nodes. Thus, a computer system using a Bit-tree structure is significantly more efficient than prior art B-tree search tree structures.

However, as the access rate of data storage units on which a database can be stored has increased, the time required to sequentially search a leaf node has become more and more significant. Therefore, there is a need for a method and apparatus for sorting and searching for data which accelerates the search through leaf nodes of a key index tree structure in a database.

The following invention provides such a method and apparatus.

SUMMARY OF THE INVENTION

The present invention is a method and apparatus for increasing the speed of a search through leaf nodes of an inventive key index tree structure, known as a "Q-tree". The key index tree structure of the present invention has root and branch nodes that are essentially the same as the root and branch nodes of Bit-trees. The heart of the present invention lies in the leaf nodes of the present inventive tree.

The present invention identifies "decision-bits" within leaf node entries and uses these decision-bits to accelerate searches for a particular record or for a record adjacent to which a new record is to be inserted. A decision-bit is a particular type of distinction-bit associated with a search key within a designated search range. The designated search range may be an entire leaf node or a contiguous part thereof. A decision-bit has a value that is less than the value of all other distinction-bits associated with keys in a specified search range.

Each decision-bit divides a search range into "left" and "right" parts. The parts may be of unequal sizes. One of the two parts will constitute a "new" search range. A first bit in the search key being sought (known as a "quit-bit"), having an ordinal number equal to the value of the decision-bit for the search range, is tested. If the quit-bit is "on", then the right, or greater value, part becomes the new search range. Otherwise, the left, or lesser value, part becomes the new search range. Thus, each time a quit-bit of the search key is tested, the "old" search range is reduced in size and a different distinction-bit becomes the decision-bit for the new search range. In one embodiment of the present invention, this process continues until the search range is diminished to its minimum size (i.e., comprises only one leaf node entry). Thus, the set of decision-bits form an unbalanced binary search tree within a leaf node.

In the preferred embodiment of the present invention, a decision-bit pointer which identifies the relative location of a first decision-bit of a leaf node (i.e., the "root" decision-bit) is placed in a predetermined location within the prologue of each leaf node. Additional decision-bit pointers are associated with each subsequent decision-bit within the leaf node and indicate the relative location of such decision-bits with respect to the current decision-bit. In one embodiment of the present invention, a pair of decision-bit pointers are located in the bytes adjacent to, and to the right of, the relative record number (RRN) of a leaf node decision-bit entry. In the preferred embodiment, decision-bit pointers are not required when the next decision-bit is in the entry adjacent to the entry of a present decision-bit, thus reducing the space taken up by pointers. In another embodiment of the present invention, decision-bit pointers are located in a "quit-index" in the prologue of each leaf node. The use of a quit-index permits the format of entries in a Q-tree leaf node to be the same as the format of entries in a Bit-tree leaf node, thereby making Q-trees compatible with algorithms to be used for searching Bit-trees. Furthermore, use of a quit-index allows easier index sequential processing of leaf nodes.

The use of decision-bits substantially reduces the number of tests to be performed to determine the location of a particular record via a search of Bit-tree leaf node entries. Thus, the time required to search a leaf node of a key index tree structure is dramatically decreased.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings refer to like elements.

DETAILED DESCRIPTION OF THE INVENTION

Figure 1:
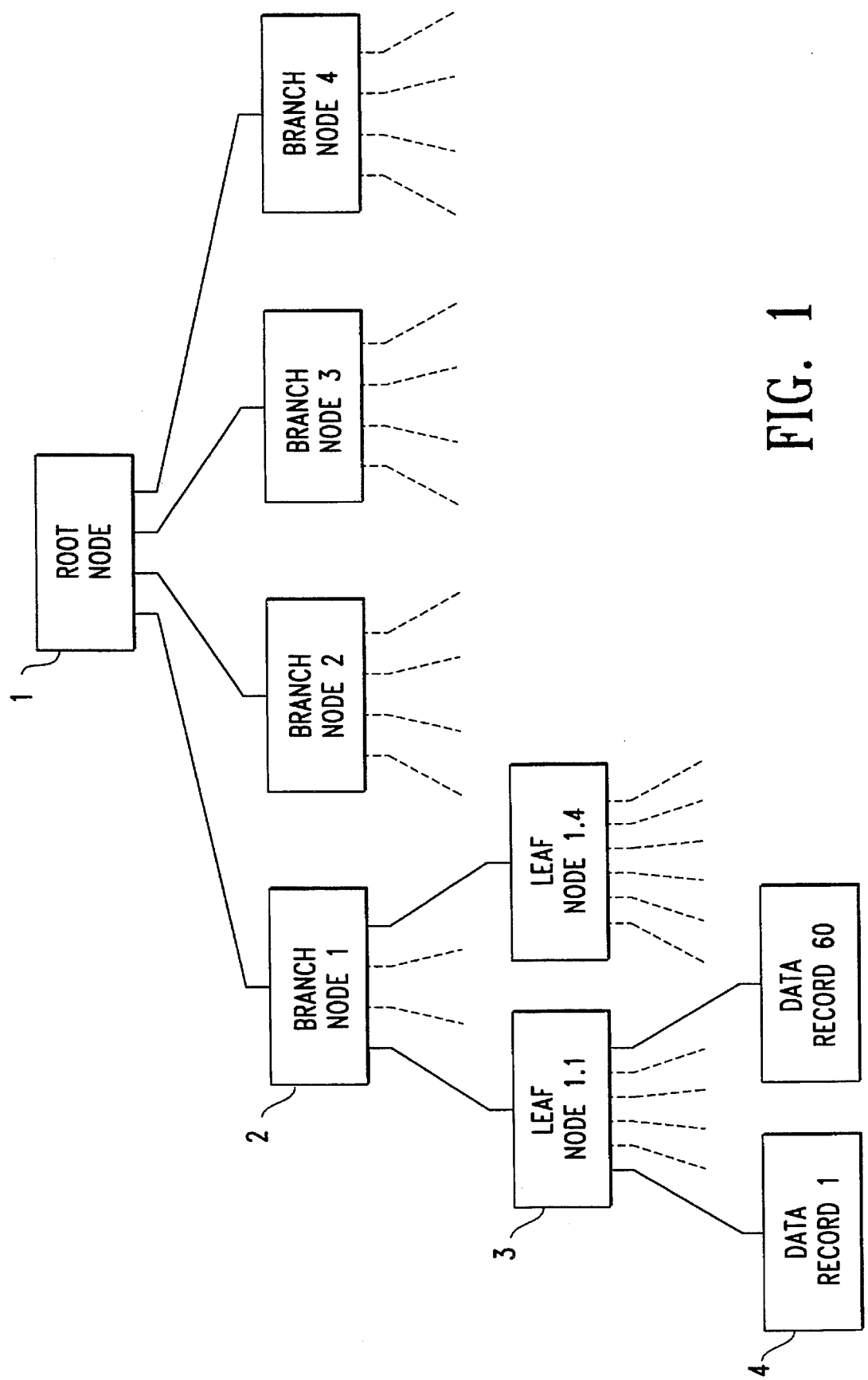
FIG. 1 is a diagram of a Q-tree in accordance with the present invention.

Throughout this description, the preferred embodiment and examples shown should be considered as exemplars, rather than as limitations on the present invention.

Overview

The present invention is a method and apparatus for indexing data in a computer system comprising a processor, a data memory, and a data storage device in which a database is stored. The inventive multi-way tree structure is known as a "Q-tree". A Q-tree is initially stored in the data storage device and is used to reduce the time required to search for a record within the database.

The inventive tree has nodes that are essentially the same as the root node, branch nodes, and leaf nodes of a Bit-tree, such as is described in U.S. Pat. No. 4,677,550, assigned to the assignee of the present invention. However, by designating at least one distinction-bit to be a "decision-bit" and setting a pointer to each decision-bit, a "quit-bit" can be identified within a SEARCH KEY (i.e., the key associated with the record that is being sought). The use of decision-bits and quit-bits significantly decreases the time required to search a leaf node.

In accordance with the present invention, each search key within a database is associated with a corresponding leaf node entry in which is stored a distinction-bit which identifies the ordinal number of the most significant bit of the search key that differs from a logically "adjacent" search key, as is described in detail in U.S. Pat. No. 4,677,550. Two search keys are considered to be logically adjacent if no other search key has a value that is greater than the value of one of the two search keys, and less than the value of the other. A first search key is considered to be to the "left" of a second search key if the value of the first search key is less than the value of the second search key. Similarly, a first search key is considered to be to the "right" of a second search key if the value of the first search key is greater than the value of the second search key. Leaf node entries and the distinction-bits stored therein are logically ordered to match the logical order of their corresponding search keys. In the preferred embodiment of the present invention, the entries are also physically ordered to match the logical order of their corresponding search keys.

The heart of the invention is the ability to identify and use certain distinction-bits to divide a search range after the range has been narrowed to a single leaf node by known Bit-tree searching techniques. The invention is based on the fact that a sequence of binary values having the same number of binary digits (such as search keys associated with records in a database) can be divided into subsequences at the point in the sequence at which the most significant bit transitions from a first value to a second value (i.e., from a "0" to a "1"). In the present invention, since a distinction-bit determines the ordinal number of the most significant bit (MSB) that is distinct between two adjacent search keys, distinction-bits can be used to divide an ordered sequence of search keys into a first, or "left", subsequence in which the MSB of each search key is in one state (e.g., reset or "0"), and a second, or "right", subsequence in which the MSB of each associated search key is in the other state (e.g., set, or "1"). The point at which the sequence divides is indicated by a distinction-bit referred to as a decision-bit. Accordingly, a decision-bit is merely a special case of a distinction-bit. Each subsequence can be further divided into a first part (which is itself a new subsequence) in which the second MSB of each search key is in one state (e.g., reset) and a second part (which is another subsequence) in which the second MSB of each associated search key is in the other state (e.g., set). Once again, the point at which the subsequence divides is designated as a decision-bit.

By identifying decision-bits within a leaf node, a logical tree of decision-bits can be generated. Thereafter, the decision-bits of the tree can then be used to identify "quit-bits" in a SEARCH KEY, which are tested to determine whether the search key equal to or closest to the SEARCH KEY is to be found in the subsequence(s) to the left or the subsequence(s) to the right of each decision-bit.

Q-Tree Architecture

FIG. 1 is a diagram of a multi-way Q-tree structure in accordance with the present invention. The tree structure of the preferred embodiment of the present invention includes at least a root node 1 and associated data records 4. In trees in which only a root node 1 and associated data records 4 are present, the root node is structured in the same manner as leaf nodes described below. If the tree has a sufficient number of entries, branch nodes 2 and leaf nodes 3 are included, as shown in FIG. 1.

Figure 2:
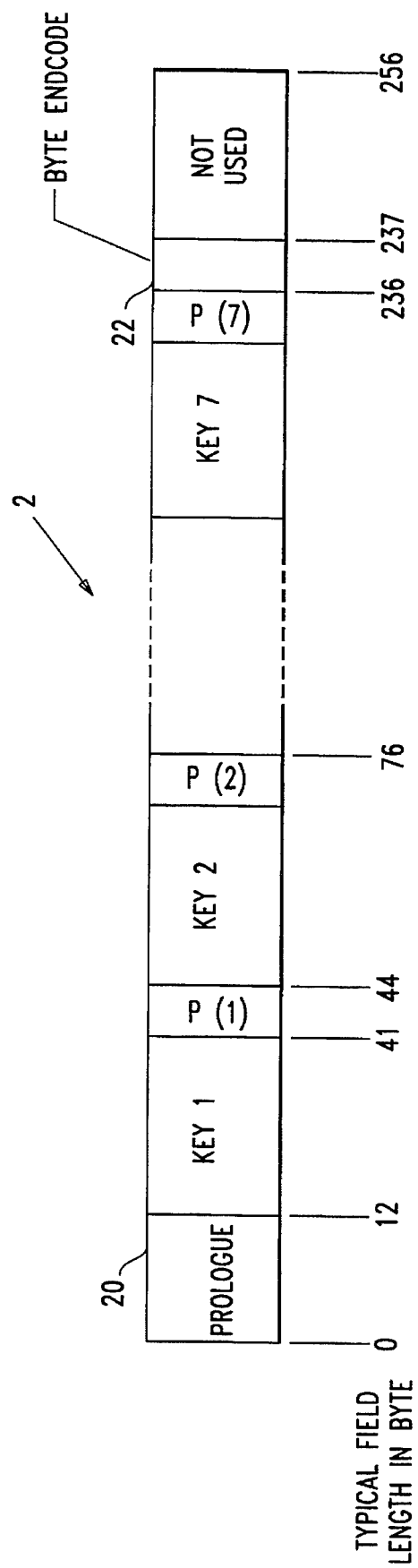
FIG. 2 is a diagram of the format of a typical branch node within the Q-tree of the preferred embodiment of the present invention.

FIG. 2 is a diagram of the format of a typical branch node 2 within the Q-tree of the preferred embodiment of the present invention. The illustrated branch node 2 includes a prologue 20 which contains system information. In one embodiment of the present invention, the remainder of the branch node 2 contains keys (such as key1, key2, etc.) and their associated pointers (such as P(1), P(2), etc.). The illustrated branch node 2 further includes an end code 22 to mark the end of the branch node 2. Such an end code 22 is not typically used when all branch nodes 2 have the same length. Further details of key index trees in general, and more specifically, of branch nodes and root nodes in accordance with the preferred embodiment of the present invention, are provided in U.S. Pat. No. 4,677,550 assigned to the assignee of the present invention, which is herein incorporated by reference.

Figure 3:
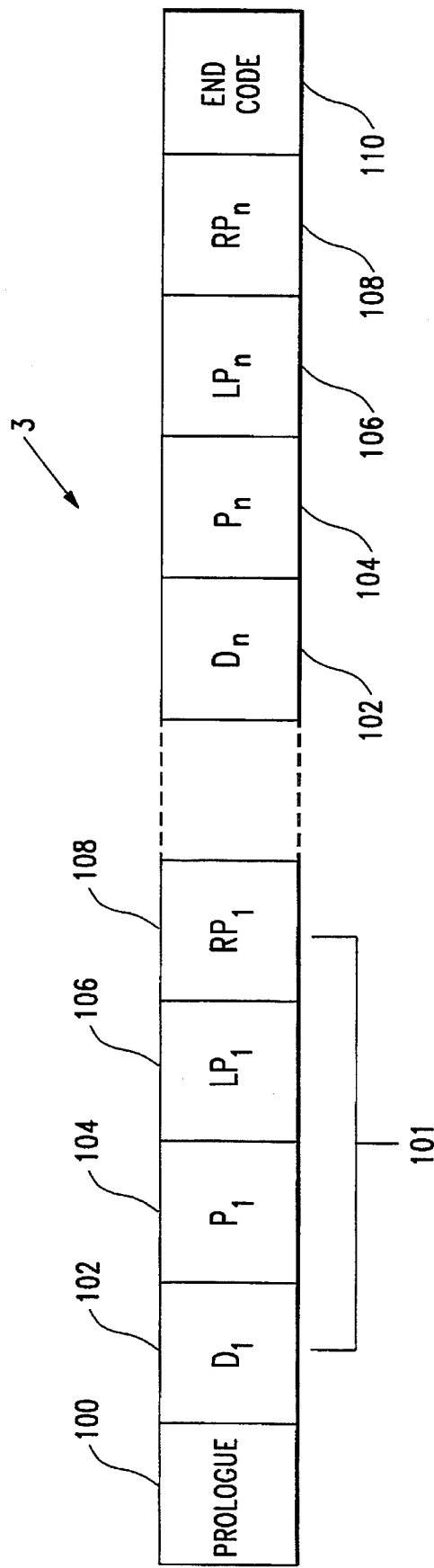
FIG. 3 is a diagram of the format of a Q-tree leaf node in accordance with the present invention.

FIG. 3 is a diagram of the format of a leaf node 3 in accordance with the present inventive Q-tree. Since each leaf node 3 has the same architecture, only one leaf node 3 is described for the sake of both clarity and brevity. The leaf node 3 of the illustrated embodiment includes a prologue 100 and at least one entry 101. Each entry 101 to the leaf node 3 is associated with a search key stored in a corresponding data record 4. Entries 101 include: a distinction-bit field 102, such as is described in U.S. Pat. No. 4,677,550; a pointer field 104 containing a unique record location reference, such as a relative record number (RRN) of a record corresponding to the entry 101; a "left" decision-bit pointer 106; and a "right decision-bit pointer 108. In an alternative embodiment described in greater detail below, not all entries include a left decision-bit pointer 106 and a right decision-bit pointer 108.

Figure 4:
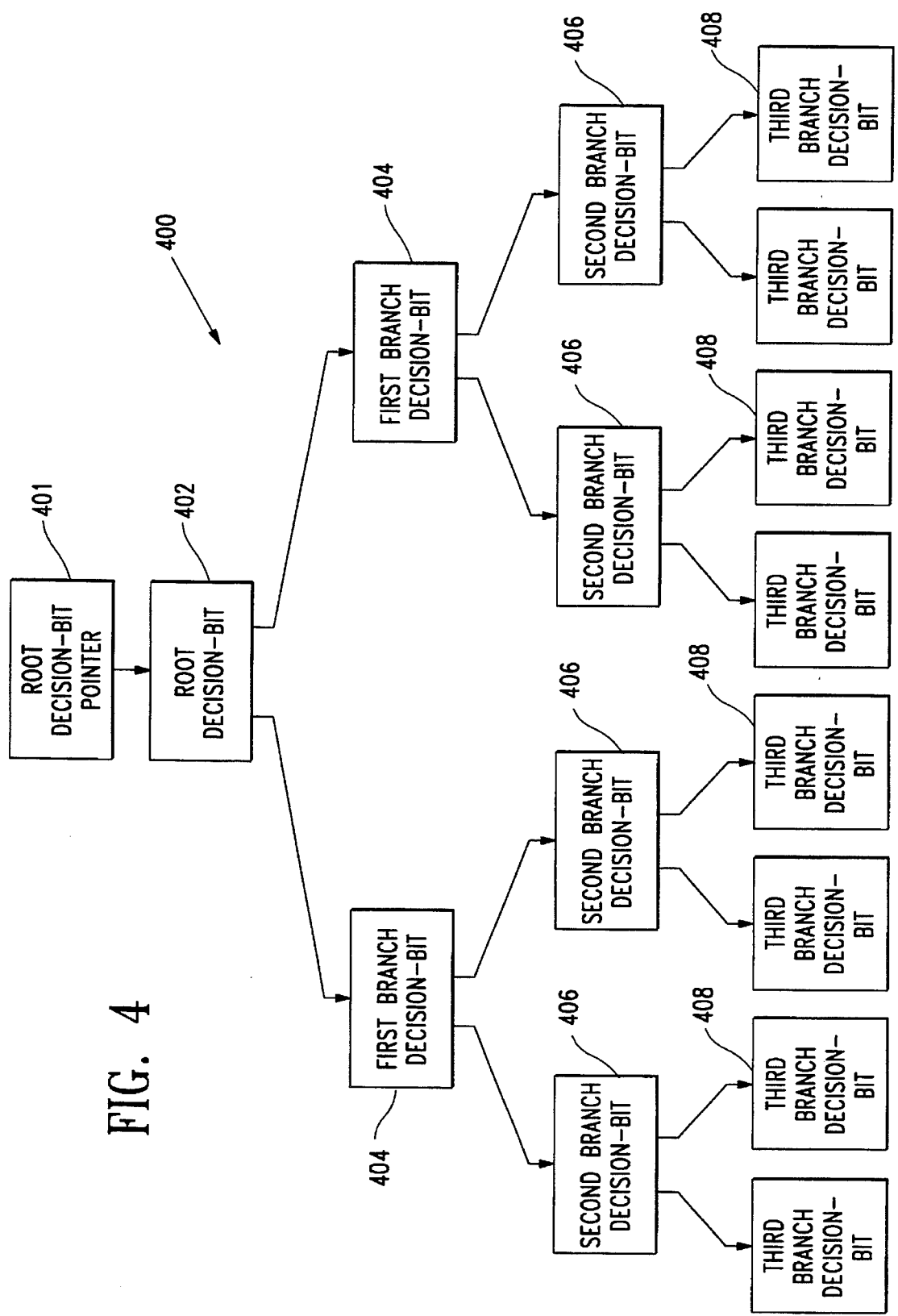
FIG. 4 is an illustration of a tree of decision-bits in accordance with the present invention.

FIG. 4 is an illustration of a tree of decision-bits 400. A distinction-bit stored in the distinction-bit field 102 of one entry 101 in each leaf node 3 is designated a "root" decision-bit 402. A pointer 401 in the prologue 100 of the leaf node 3 indicates the location of the entry 101 that contains the root decision-bit. The root decision-bit entry divides the leaf node 3 into a left part and a right part. The value of the root decision-bit 402 indicates the ordinal number of the MSB of the first search key in the sequence of search keys associated with the entries 101 to the leaf node 3 that changes logical state (i.e., from a "0" to a "1"). Since the search keys are logically ordered by their binary numerical value, the logical state of the bit within that first search key at the ordinal number equal to the value of the root decision-bit 402 divides the leaf node into a right and left part. For example, if the root decision-bit 402 has a value of 3, then the MSB and the second MSB of each search key associated with the entries 101 to the leaf node are in the same binary state (i.e., "0"). The third MSB (i.e., the third bit counting from the left) of a search key determines whether the entry 101 associated with that search key is in the right part or the left part of the leaf node 3. In this example, if the third MSB of a search key is set (i.e., a binary "1"), then the entry 101 associated with that search key is in the right part of the leaf node 3. On the other hand, if the third MSB of a search key is reset (i.e., a binary "0"), then the entry 101 associated with that search key is in the left part of the leaf node 3.

The left and right parts of the leaf node 3 branching from the root decision-bit entry each include one entry having a distinction-bit (which is referred to as the "first branch decision-bit" 404) that further divides that part of the leaf node 3. In the same manner that the root decision-bit 402 divides the leaf node 3, each first branch decision-bit 404 divides the left and right parts of the leaf node 3 into "left" and "right" subparts. In a manner similar to that described above, for the root decision-bit, the value of the first branch decision-bit 404 of the left part of the leaf node 3 indicates the ordinal number of a bit within each search key associated with the entries 101 in the left part of the leaf node 3. That bit determines whether an entry 101 in the left part of the leaf node 3 is further assignable to the left subpart or right subpart of the left part of the leaf node 3. The same is true of the first branch decision-bit 404 in the right part of the leaf node 3.

The left decision-bit pointer stored in the left decision-bit pointer field 106 of the root decision-bit entry locates the entry 101 containing the first branch decision-bit 404 for the left part of the leaf node 3. The right decision-bit pointer stored in the right decision-bit pointer field 108 of the root decision-bit entry locates the first branch decision-bit entry for the right part of the leaf node 3. Similarly, the right decision-bit pointer and left decision-bit pointer stored in the pointer fields 106, 108 of each first branch decision-bit entry locate a pair of entries 101 which have second branch decision-bits 406 stored in the distinction-bit fields 102. In similar manner, third branch decision-bits 408 are designated. This architecture can be replicated through the leaf node 3 until no further branching is possible.

The decision-bit tree may have any number of branch decision-bits, depending upon the number and relationship of the search keys associated with the leaf node 3. The decision-bit tree may be unbalanced (i.e., there may be more entries associated with one part of the tree then the other). Furthermore, the decision-bit tree may not be complete. In such a case, a sequential search would begin at the point at which the decision-bit tree stopped, as further described.

Generation of a Leaf Node of a Q-Tree

Figure 5:
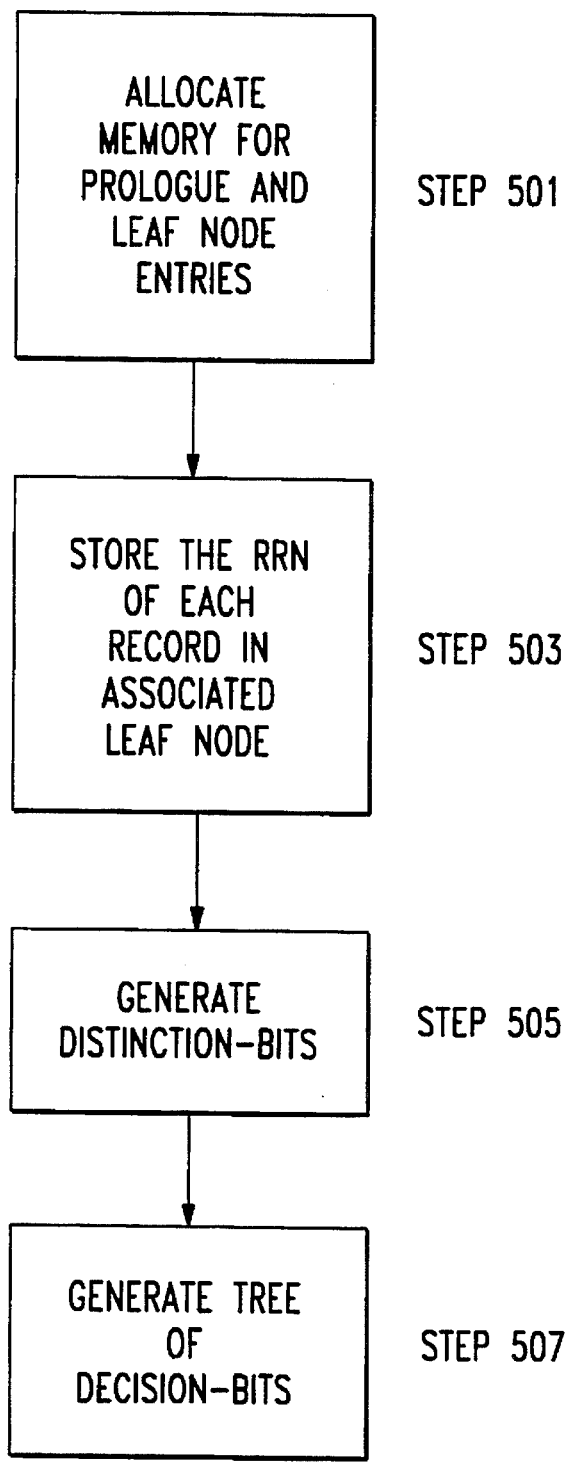
FIG. 5 is a flowchart of the steps of the process of the preferred embodiment of the present invention for generating a leaf node of a Q-tree.

FIG. 5 is a flowchart of the steps of the process of the preferred embodiment of the present invention for generating a leaf node 3 of a Q-tree. Since each leaf node 3 can be generated by the same process, the process is described in terms of a single leaf node 3. One prologue 100 and a number of empty leaf node entries 101 equal to the number of records to be associated with the leaf node 3 are generated (i.e., space is allocated for the prologue 100 and empty leaf node entries 101) (STEP 501). The number of entries 101 depends upon the size of the memory of the system in which the Q-tree is to be implemented. The RRN of each record associated with the leaf node 3 is stored in the pointer field 104 of corresponding entry 101 (STEP 503).

Distinction-bits are then generated for each entry 101 (STEP 505). Distinction-bits are generated in one of a number of ways. For example, distinction-bits can be generated as taught in U.S. Pat. No. 4,677,550.

Figure 6:
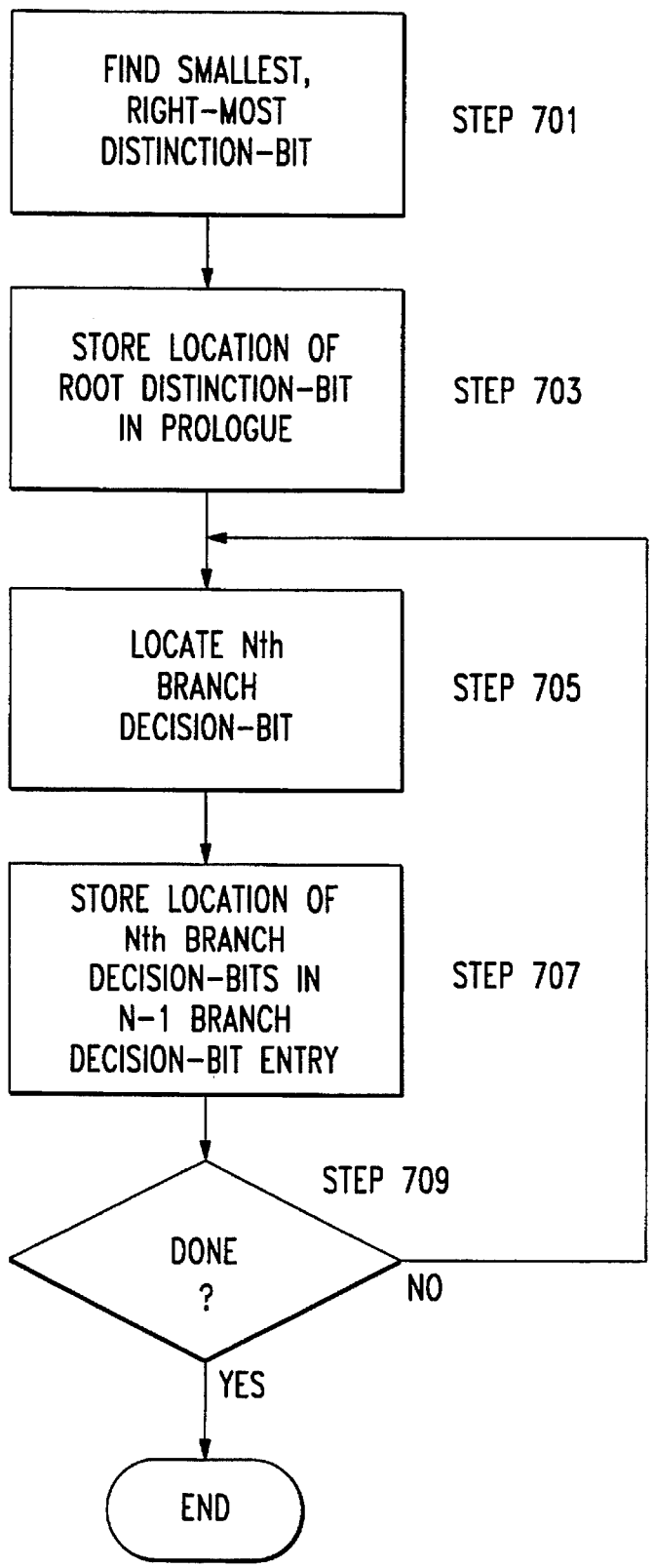
FIG. 6 is a flowchart of the process of the preferred embodiment of the invention for generating a tree of decision-bits.

Once each distinction-bit has been generated, a tree of decision-bits and associated decision-bit pointers is generated (STEP 507). The tree of decision-bits is generated for a leaf node 3 by locating the root decision-bit associated with the leaf node 3 and preferably storing a pointer to the root decision-bit in the prologue 100 of the leaf node 3. FIG. 6 is a flowchart of the process of the preferred embodiment of the invention for generating a tree of decision-bits. In FIG. 6, the root decision-bit of the leaf node 3 is found by locating the distinction-bit having the lowest value within the leaf node 3 (STEP 701). Once the root decision-bit of a leaf node 3 has been located, the location of the root decision-bit entry 101 is stored in the prologue 100 of the leaf node 3 (STEP 703).

Next, each first branch decision-bit must be located (STEP 705). Each first branch decision-bit 404 is located by identifying the smallest, right-most distinction-bit within the associated part of the leaf node 3. In one embodiment, the location of the first branch decision-bit 404 associated with the left part of the leaf node 3 is stored in the left decision-bit pointer field 106 of the root decision-bit entry, and the location of the first branch decision-bit 404 associated with the right part of the leaf node 3 is stored in the right decision-bit pointer 108 of the root decision-bit entry (STEP 707). Next, the second branch decision-bits 406 are located in the same manner that the first branch decision-bits 404 were located (i.e., by finding the smallest, right-most distinction-bit associated with the associated subpart of the leaf node 3). The location of the second branch decision-bits 406 are stored in the corresponding decision-bit pointer fields 106, 108 of the first branch decision-bit entries. This process of locating Nth branch decision-bits and storing the locations a corresponding in N-1 branch decision-bit entry continues until the decision-bit pointers 106, 108 of each entry 101 have been loaded with the location of a lower-level entry 101 (STEP 709).

Searching a Q-Tree

A search for a key, in accordance with the Q-tree of the present invention, proceeds in the same manner as a search through a Bit-tree would proceed (such as described in U.S. Pat. No. 4,677,550), until the search reaches a leaf node 3. For example, each key of a root node 1 is read into memory and the keys stored in the root node 1 are compared in sequence with a SEARCH KEY until the SEARCH KEY is found to be less than, or equal to, a key within the root node 1. If the SEARCH KEY is found to be less than the first key within the root node 1, then a key pointer to the first branch node 2 is used to find the beginning of the first branch node 2. Otherwise, the SEARCH KEY is compared to each search key of the root node 1 in sequence from lowest to highest. When the SEARCH KEY is found to be less than a key in the root node 1, the pointer associated with that key is used to find the appropriate branch node 2 in which the search continues. The branch node 2 is then read into memory. This process continues down the tree until the search leads to a leaf node 3. At that point in the search, the search range comprises only the search keys associated with the entries within that leaf node 3. The pointer within the branch node 2 that leads to the leaf node 3 locates the prologue 100 of the appropriate leaf node 3.

Figure 7:
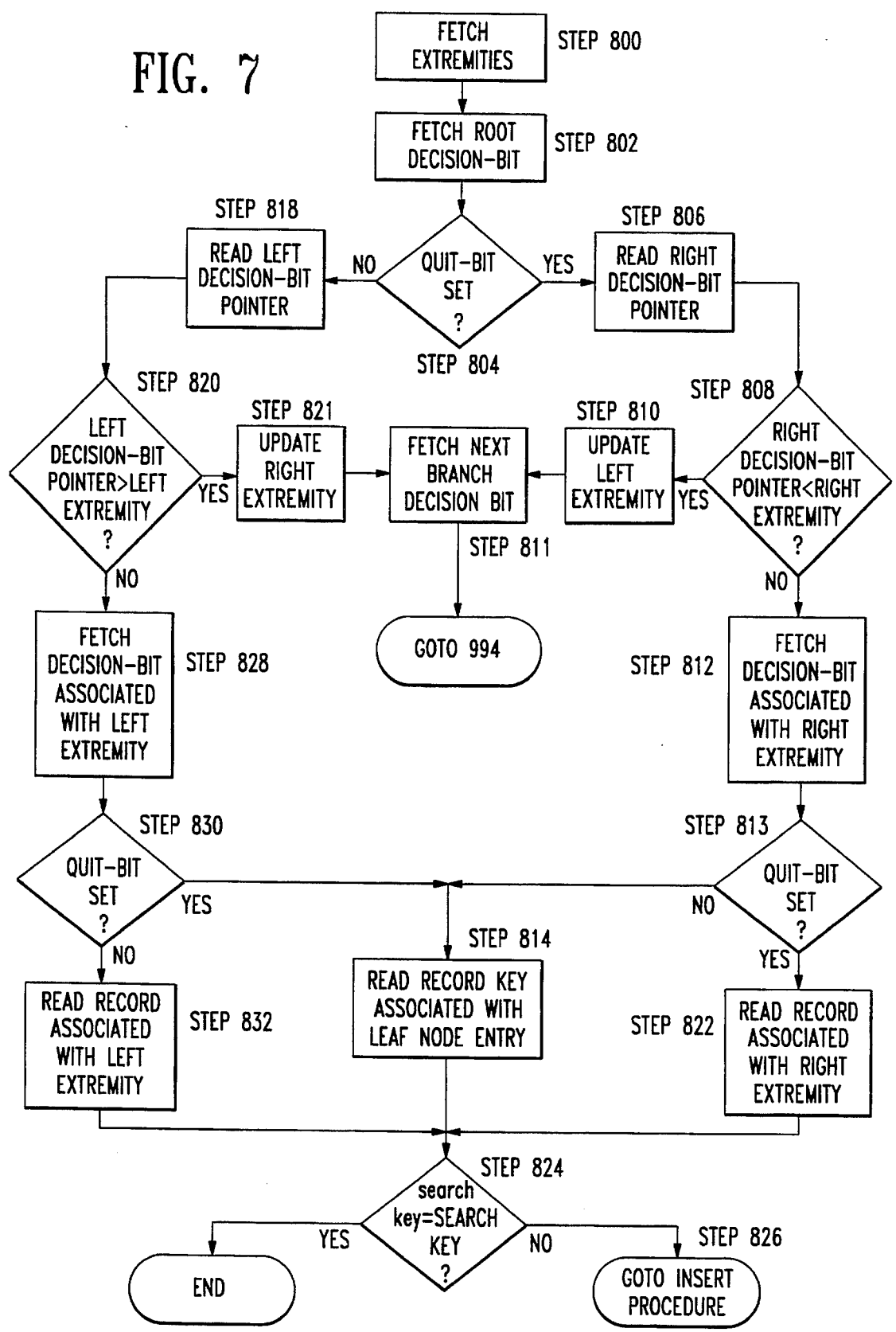
FIG. 7 is a flowchart of the steps included in the preferred embodiment of the inventive search procedure.

FIG. 7 is a flowchart of the steps included in the inventive procedure for searching a leaf node 3 of a Q-tree. In the preferred embodiment of the present invention, these steps are executed by a computer system beginning at the point at which the search leads to a leaf node 3.

In one embodiment of the present invention, the leaf node 3 is read into a memory device of the computer system. The prologue 100 includes the relative location of the first and last entries 101 in the leaf node 3 and the relative location of the root decision-bit 402 within the leaf node 3. The relative location of the first entry 101 in the leaf node 3 is read from the prologue 100 and loaded into a first variable known as "left extremity", and the relative location of the last entry 101 in the leaf node 3 is read from the prologue 100 and loaded into a second variable known as "right extremity" (STEP 800). The right extremity and left extremity define the current range of the search. It should be clear that initially, the search range is an entire leaf node 3.

The relative location of the root decision-bit 402 is then read from the prologue 100 and the root decision-bit 402 is fetched (STEP 802). The state of the bit of the SEARCH KEY having an ordinal number equal to the value of the root decision-bit (i.e., the quit-bit) is tested (STEP 804). If the quit-bit is set (a logic "1"), then the search proceeds to the right part of the decision-bit tree. If the search proceeds to the right, then the right decision-bit pointer 108 is read (STEP 806). The right decision-bit pointer 108 within the root decision-bit entry indicates the relative location of the branch decision-bit entry to the right of the root decision-bit entry.

The relative location of the right branch decision-bit is compared with the relative location of the right extremity (STEP 808). If the right decision-bit pointer is less than the right extremity, then the left extremity is updated with the value of the relative location of the prior-level decision-bit (STEP 810). This defines the right subpart as a new search range. The search then proceeds by fetching the next decision-bit using the right decision-bit pointer (STEP 811). The corresponding quit-bit of the SEARCH KEY is tested (STEP 804). If the quit-bit of the SEARCH KEY is set, processing continues as described above.

If the decision in STEP 808 indicates that the right decision-bit pointer is not less than the extremity, then the decision-bit associated with the right extremity is fetched (STEP 812). The corresponding quit-bit of the SEARCH KEY is tested (STEP 813). If the quit-bit of the SEARCH KEY is not set (i.e., is a logic "0"), then the key of the record associated with the entry 101 which contains the last read decision-bit is read (STEP 814). The search key read from the record and the SEARCH KEY are compared (STEP 824). If equal, then a match is declared and the search ends. Otherwise, the search ends without finding a match for the SEARCH KEY, and an insert procedure may be initiated in accordance with the prior art (STEP 826).

If the quit-bit tested in STEP 813 is set (i.e., is a logic "1"), then the key of the record associated with the right extremity is read (STEP 822). If the search key read from the record associated with the right extremity and the SEARCH KEY are equal (STEP 824), then a match is declared and the search ends. Otherwise, the search ends without finding a match for the SEARCH KEY, and an insert procedure must be initiated in accordance with the prior art (STEP 826).

Returning to STEP 804, if the quit-bit of the SEARCH KEY is not set (a logic "0"), then the search continues to the left subpart of the decision-bit tree. The left decision-bit pointer 106 is read (STEP 818). If the left decision-bit pointer is greater than the left extremity (STEP 820), then the right extremity is updated with the value of relative location of the prior-level decision-bit (STEP 821). The search then proceeds by fetching the next decision-bit (STEP 811).

If the decision in STEP 820 indicates that the left decision-bit pointer is not greater than the extremity, then the decision-bit associated with the left extremity is fetched (STEP 828). The corresponding quit-bit of the SEARCH KEY is tested (STEP 830). If the quit-bit of the SEARCH KEY is set (i.e., is a logic "1"), then the key of the record associated with the entry 101 which contains the last read decision-bit is read (STEP 814). If the search key read from the record and the SEARCH KEY were equal (STEP 824), then a match is declared and the search ends. Otherwise, the search ends without finding a match for the SEARCH KEY, and an insert procedure may be initiated in accordance with the prior art (STEP 826).

If the SEARCH KEY is greater than the search key read from the record, then the new record associated with the SEARCH KEY is inserted to the right of the record associated with last read entry. Otherwise, the new record is inserted to the left of the record associated with the last read entry. Upon inserting a new record, the relative location of each entry to the right of the location at which the new record is inserted is incremented by one. Furthermore, a new entry must be inserted in the leaf node 3, and the distinction-bits updated to reflect the presence of the new record. Since a distinction-bit will be added upon inserting a new record, the decision-bit pointers may also require updating. With these exceptions, new entries into a leaf node 3 of the present invention are inserted in essentially the same manner as described in U.S. Pat. No. 4,677,550.

If the quit-bit tested in STEP 830 is not set (i.e., is a logic "0"), then the search key of the record associated with the left extremity is read (STEP 832). If the search key read from the record associated with the left extremity and the SEARCH KEY are equal (STEP 824), then a match is declared and the search ends. Otherwise, the search ends without finding a match for the SEARCH KEY, and an insert procedure must be initiated in accordance with the prior art (STEP 826).

An alternative embodiment of the present invention is possible wherein the decision-bit tree is not complete (i.e., an insufficient number of decision-bit pointers are present in the decision-bit tree to narrow the search range to a particular entry 101 and corresponding search key). In such a case, at the point in the search where the last decision-bit is found and the last quit-bit tested, the search proceeds sequentially rightward in the last located subpart.

EXAMPLE

Figure 8A:
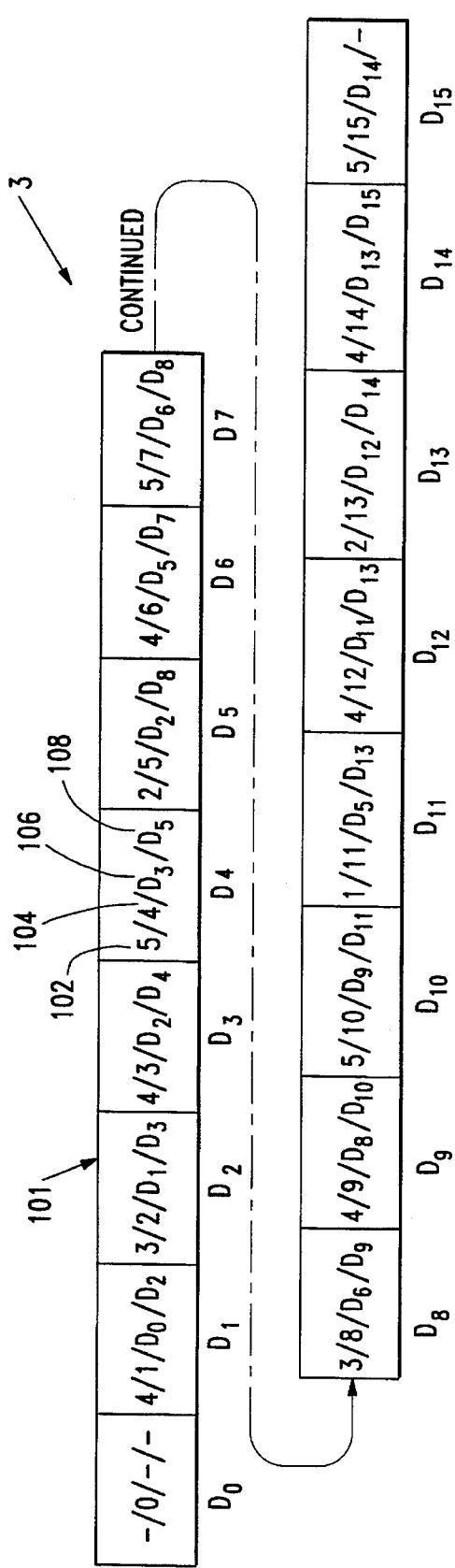
FIG. 8A is an illustration of an example of a portion of a leaf node in which the values of distinction-bits, RRNs, left decision-bit pointers, and right decision-bit pointers are shown.
Figure 8B:
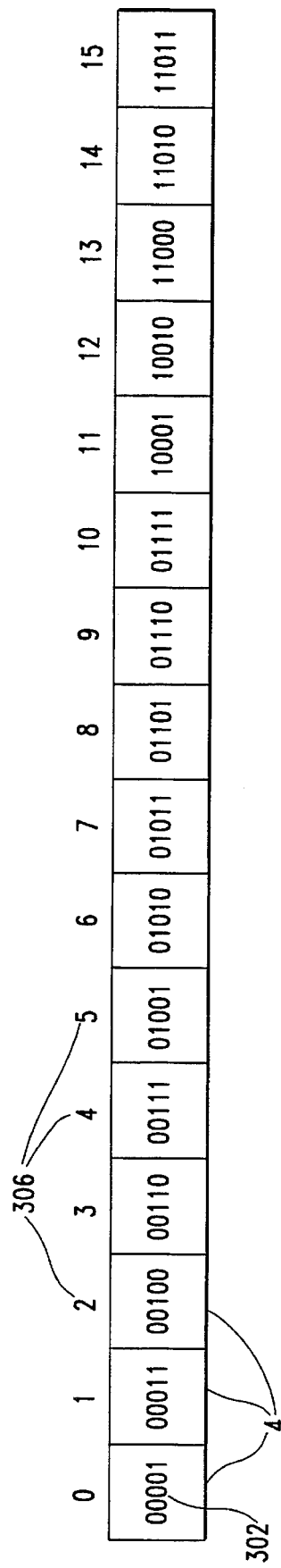
FIG. 8B is an illustration of keys associated with the leaf node entries of FIG. 8A and stored in records.

FIG. 8A is an illustration of an example of a portion of a leaf node 3 in which the values of the distinction-bit fields 102, the RRNs 104, the left decision-bit pointers 106, and right decision-bit pointers 108 are shown. For example, in entry $D_1$, the format "4/1/$D_0$/$D_2$" indicates a distinction-bit value of 4, an RRN of 2, a left decision-bit pointer pointing to entry $D_0$, and a right decision-bit pointer pointing to entry $D_2$. It should be noted the entry $D_0$ is only provided for the purpose of locating the record that is located sequentially to the left of the record located by the RRN field 104 of the entry $D_1$. The prologue 100 of the leaf node 3 is not shown in FIG. 8A. FIG. 8B is a related figure illustrating the associated keys 302 stored in records 4, and identified by a relative location 306. It should be understood that for illustrative purposes, only the keys 302 within the data records 4 are shown in FIG. 8B. The following is an example of the process for searching the leaf node 3 shown in FIG. 8A in accordance with the preferred embodiment of the present invention.

The pointer within the branch node 2 that leads to the illustrated leaf node 3 locates the prologue 100 of the leaf node 3. The prologue 100 includes the relative location $D_1$, $D_{15}$ of the first and last entries 101 in the leaf node 3 and the relative location $D_{11}$ of the root decision-bit 402 within the leaf node 3. The relative location $D_1$ of the first entry 101 in the leaf node 3 is read from the prologue 100 and loaded into the left extremity variable and the relative location $D_{15}$ of the last entry 101 in the leaf node 3 is read from the prologue 100 and loaded into the right extremity variable.

As can be seen by comparing the sequence of keys in FIG. 8B, the highest-order bit changes from "0" to "1" from record 10 to record 11. The distinction-bit for record 11 would equal "1", the ordinal number of the first bit position in which the corresponding keys differ in value. No other distinction-bit equal to "1" exists to the right of record 11, and thus the corresponding entry 101 at relative location $D_{11}$ contains the root decision-bit 402.

To search the relative location $D_{11}$ of the root decision-bit 402 is read from the prologue 100 and the root decision-bit 402 is fetched. The quit-bit of the SEARCH KEY is tested. For the purposes of this example, assume that the SEARCH KEY is "11001". In this example, the root decision-bit 402 at location $D_{11}$ is "1". Therefore, the first bit of the SEARCH KEY (starting from the highest order bit) is the quit-bit. In this case, the quit-bit "$\underline{1}$1001" is set. Therefore, the search proceeds to the right using the right decision-bit pointer, which points to location $D_{13}$. The branch decision-bit at $D_{13}$ is located and read.

The relative location $D_{13}$ of the first branch decision-bit to the right is compared with the relative location $D_{15}$ of the right extremity. Since the right decision-bit pointer is not equal to the right extremity, the left extremity is updated with the value of the relative location $D_{11}$ of the root decision-bit. Thus, the search range is narrowed to those entries to the leaf node 3 that are to the right of $D_{11}$ and to the left of $D_{15}$. Therefore, the search range has already been narrowed to less than half the leaf node 3. The search then proceeds by fetching the next decision-bit in $D_{13}$ (i.e., the second branch decision-bit). The decision-bit stored at location $D_{13}$ is "2". Therefore, the second bit of the SEARCH KEY "1$\underline{1}$001" is tested. In the present example, the second bit is set. Therefore, the search continues to the right of the current search range, using the right decision-bit pointer, which points to location $D_{14}$. The right decision-bit pointer $D_{14}$ is compared to the right extremity $D_{15}$. Since they are not equal, the left extremity is updated with the location $D_{13}$ of the prior level decision-bit, thereby further narrowing the search range to $D_{13}$ to $D_{15}$.

The next decision-bit (i.e., the third branch decision-bit) in location $D_{14}$ is fetched. That decision-bit stored at location $D_{14}$ is "4". Hence, the fourth bit of the SEARCH KEY "110$\underline{0}$1" is tested as the quit-bit. Since the quit-bit is not set, the search continues to the left of the current search range, using the left decision-bit pointer, which points to $D_{13}$. Since the left extremity is equal to the left decision-bit pointer $D_{13}$, the decision-bit of the prior entry at location $D_{14}$ is the closest distinction-bit to the SEARCH KEY. Therefore, the key associated with the prior decision-bit at $D_{14}$ is read and compared with the SEARCH KEY "11001".

In the present example, the search ends without finding a match for the SEARCH KEY "11001" within the database and an insert procedure may be initiated.

Decision-Bit Pointers

As can be seen from FIG. 8A, the use of a left and right decision-bit pointer 106, 108 associated with each decision-bit requires space within the leaf node 3 that would otherwise be used to include more entries in the leaf node 3. For example, if the leaf node 3 is 2048 bytes long, and the prologue 100 requires 13 bytes and each entry requires 8 bytes (i.e., one byte for the decision-bit, three bytes for the RRN of the record associated with the decision-bit, and four bytes for the decision-bit pointers), then only 254 entries will fit in one leaf node 3. In contrast, a leaf node 3 of the same size in a standard Bit-tree can maintain up to 508 entries. Because limiting the number of data accesses reduces the amount of time required to perform a search, it is advantageous to store as many entries in a leaf node as possible, even in a system with relatively fast access times.

While each entry within a leaf node 3 of a Q-tree can contain two pointers which allow the search to branch in either of two directions, there is only one search path to any one decision-bit. This is understood by noting that the point of entry into the leaf node 3 is always fixed (i.e., the root decision-bit 402). If the entries are considered homogeneous, there are 2n+1 pointers for a node with n entries (i.e., each entry contains two pointers. In addition, there is one pointer in the prologue). However, entries need not be homogeneous. Therefore empty pointer fields 106, 108 need not be kept. There are at least n+1 empty pointer fields 106, 108, and so there are at most n used pointer fields 106, 108. This is obvious when n=0. Adding a new entry causes either an empty right decision-bit pointer field 106 or empty left decision-bit pointer field 108 to become occupied with a pointer to the decision-bit within the new entry, and creates two new empty pointer fields 106, 108 within the new entry. Therefore, it can be seen that for any value n there are at most n used pointer fields 106, 108.

A further reduction in the number of decision-bit pointers required can be realized if decision-bit pointers are not used to point to decision-bit fields 102 contained within adjacent entries (adjacent decision-bits). The number of decision-bit pointers that would point to an adjacent decision-bit depends upon the particular keys within the records associated with the decision-bit fields 102 of the leaf node 3. A statistical determination of the average savings in space could be provided. However, it should be clear, even without such a showing, that a substantial savings in space can be realized by eliminating decision-bit pointers that point to adjacent decision-bits. In an embodiment of the present invention in which there are no pointers to decision-bits located in adjacent entries, when an entry has no right decision-bit pointer field 108, a right decision-bit is located by incrementing the relative location of the present entry by one. Likewise, if the present entry has no left decision-bit pointer field 106, a left decision-bit is located by decrementing the relative address of the present entry by one.

Thus, the length of an entry of the preferred embodiment of the present invention varies depending upon the number of decision-bit pointers included in that entry.

Determining the Presence of a Decision-Bit Pointer Field

To determine the location of a next decision-bit, it is important to know whether an entry has a left or right decision-bit pointer field 106, 108. Furthermore, because variable length entries are used in the preferred embodiment of the present invention, it is important to determine the number of decision-bit pointers present in a left adjacent entry when searching for the beginning of that adjacent entry. In particular, this is important when the present decision-bit is not set, and no left decision-bit pointer is present (i.e., the next decision-bit is in the adjacent entry to the left), or when performing index sequential processing through the leaf node 3 from right to left.

The characteristics of the particular storage system provide information that is used to determine the location of an adjacent distinction-bit. In the illustrated embodiment of the present invention used here as an example, the maximum number of records that can be stored in the database is $2^{24}$ (16 megabytes), and thus a relative record number having three bytes can locate any record. Leaf nodes 3 are each 2 Kbytes long. Decision-bits are one byte long and are biased by a value of 8. Therefore, a decision-bit is an eight-bit byte with a minimum value of "0000 1000" (08 hex). In contrast, decision-bit pointers are two bytes long and have a maximum value of "0000 0111 1111 1111" (07FF hexadecimal; 2047 decimal).

When the location in a node of the present entry is known, a determination can be made as to whether a right, a left, or no decision-bit pointer is present by testing the byte located four bytes to the right of a distinction-bit (i.e., located to the right of the RRN associated with the distinction-bit). If that byte is greater than 07 hexadecimal, then the byte represents a distinction-bit. If the byte is not greater than 07 hexadecimal, then that byte is the high order byte of a two-byte decision-bit pointer. The value of the two-byte word that is formed by that byte and the next byte is compared with the relative location of the current entry to determine whether the pointer is a right decision-bit pointer or a left decision-bit pointer. Right decision-bit pointers, by their nature, must have a greater value than the value of the relative location at which they are stored; left decision-bit pointers must have a value that is less than the value of the relative location at which they are stored.

If a first decision-bit pointer is found, a second decision-bit pointer may also be included in the entry. Therefore, after finding that a first decision-bit pointer is present, testing the byte located six bytes to the right of the distinction-bit determines whether two decision-bit pointers are present. In this way, moving one entry to the right can be accomplished relatively easily.

Figure 9:
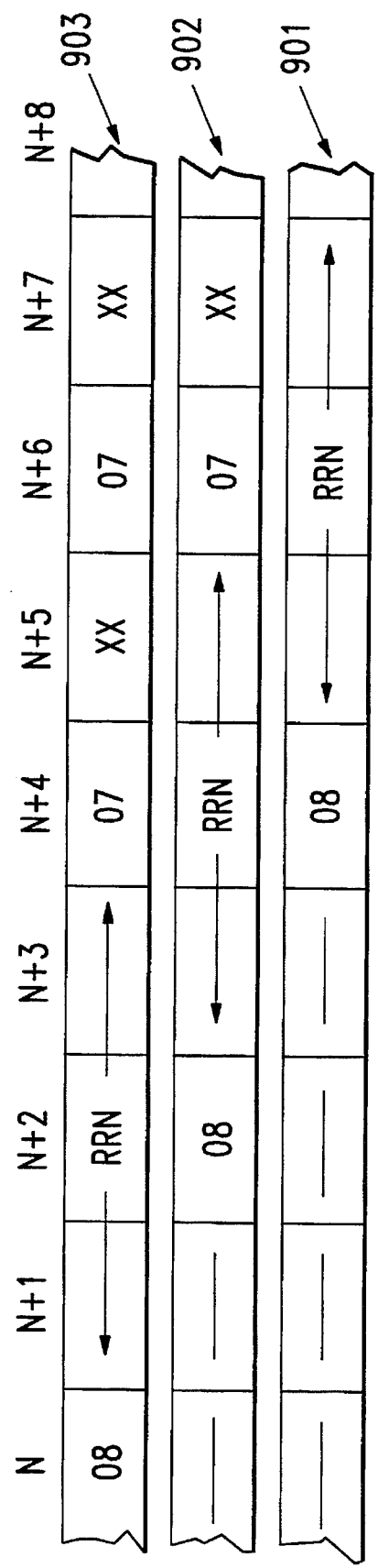
FIG. 9 is a diagram of the format of the three possible entries to a leaf node in accordance with the present invention.

However, moving to the left one entry at a time is more difficult, since the location of the beginning of the entry to the left depends upon the number of decision-bit pointers included in the entry to the left. FIG. 9 is a diagram of the format of the three possible entries to a leaf node 901, 902, 903 (i.e., the cases for the entry to the left having no decision-bits 901, one decision-bit 902, and two decision-bits 903). The three possibilities are juxtaposed to illustrate the possible values at each relative 15 location. For illustrative purposes, the values at each location are shown in FIG. 9 as being either "07", "XX", "08", or "RRN". The value "07" represents values of 7 or less (i.e., the possible values of the higher order byte of a decision-bit pointer). "XX" is used to illustrate that the lower order byte of a decision-bit pointer can be any value. The value "08" represents values of 8 or more (i.e., the possible values of a decision-bit). "RRN" represents the three byte long value of the relative record number associated with an entry. An RRN can be any number less than the total number of records in the database.

Figure 10:
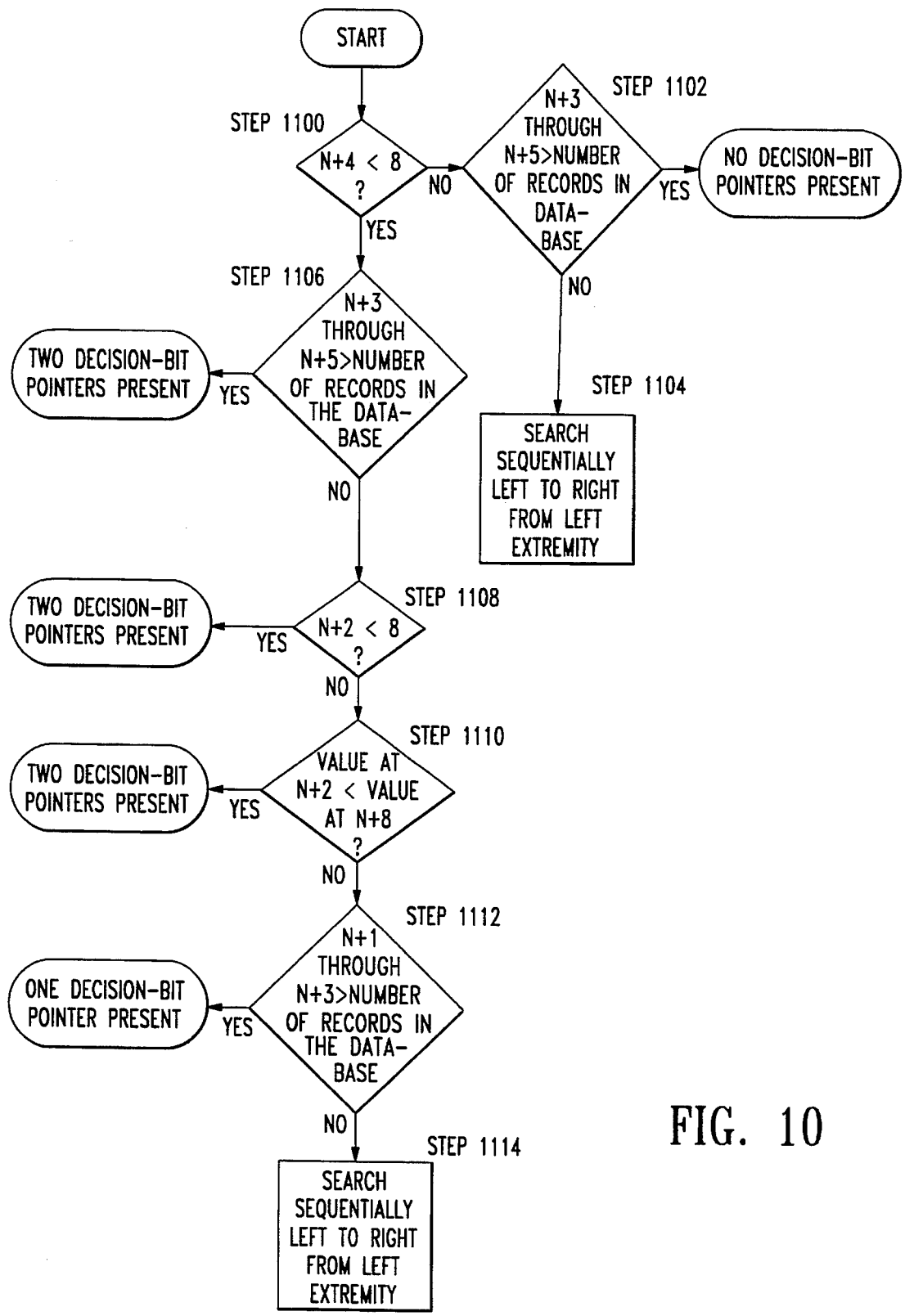
FIG. 10 is a flowchart of the procedure in the preferred embodiment used to determine the relative location of a distinction-bit within a leaf node entry that is to the left and adjacent to an entry whose relative location is known.

A series of tests can help determine how many decision-bit pointers are present in an entry to the left and adjacent to the current entry. FIG. 10 is a flowchart of the procedure used to determine the number of decision-bit pointers included in an entry adjacent to, and to the left of, an entry in a leaf node 3 of a Q-tree. Starting from the relative location N+8 of a decision-bit within a first entry to a leaf node 3, and going back 4 bytes to the relative location N+4, the value stored at relative location N+4 is compared to the value "8" (STEP 1100). If the value stored at relative location N+4 is not less than 8, then there are either zero or one decision-bit pointers present in the entry to the left of the decision-bit located at N+8 (i.e., it is impossible for situation 903 to exit). Therefore, by comparing the value stored in relative locations N+ through N+5 with the total number of records stored in the database, a determination can be made as to whether relative locations N+ through N+5 contain a valid RRN (STEP 1102). If the value stored at N+ through N+5 is greater than the total number of records stored in the database, then the value at N+ through N+5 is not a valid RRN. Therefore, the left adjacent entry has no decision-bit pointers. However, if the value stored at locations N+ through N+5 is less than the total number of records stored in the database (i.e., a valid RRN), then no clear determination can be made as to how many decision-bit pointers are present in the left adjacent entry. In such a case, a sequential search must be performed to find the beginning of the left adjacent entry (STEP 1104). The search begins from the left extremity of the current search range and proceeds to the right. Although this may seem a rather unsatisfactory solution, in practice the left extremity is typically not too distant. Furthermore, this situation arises infrequently. Therefore, the time saved by increasing the speed of the search by reducing the number of accesses to storage, and increasing the efficiency of the search procedure through a leaf node, compensates for the time required to find the beginning of an entry to the left by sequentially searching from left to right when required.

If the value stored at relative location N+4 is less than 8, then there are either one or two decision-bit pointers present in the entry to the left of the decision-bit located at N+8 (i.e., it is impossible for situation 901 to exit). This is clear from the fact that the byte at relative location N+4 must be greater than or equal to "8" if there are no decision-bit pointers in the entry 901 to the left. If the value stored in locations N+ through N+5 is greater than the total number of records stored in the database (STEP 1106), then these locations do not contain a valid RRN, and there must be two decision-bit pointers present in the left adjacent entry. If the value of locations N+ through N+5 is not greater than the total number of records stored in the database, then the byte at relative location N+2 is compared to the value "8" (STEP 1108). If the value stored at relative location N+2 is less than "8", then the entry to the left of the entry containing the decision-bit at location N+8 must have two decision-bit pointers (i.e., situation 902 can be eliminated, leaving only situation 903). If this is true, then the entry to the left begins at relative location N.

If the value stored at relative location N+2 is not less than "8", then that value is compared to the value of the decision-bit stored at relative location N+8 (STEP 1110). In a Q-tree in accordance with the present invention, the distinction-bit of an entry to the left of an entry which has no left pointer must be greater than the distinction-bit of the entry just to the right (i.e., the entry which has no left pointer). Therefore, if the value stored at relative location N+2 is less than the value stored at relative location N+8 (STEP 1110), then the entry to the left of the entry containing the decision-bit at relative location N+8 must have two decision-bit pointers. Therefore, the beginning of the adjacent entry to the left is relative location N. Otherwise, locations N+1 through N+ are read and the values stored therein are compared with the number of records stored in the database (STEP 1112). If the value stored in relative locations N+1 through N+ is greater than the number of records stored in the database, then it is not a valid RRN. Thus, there must be one decision-bit pointer and the beginning of the adjacent entry to the left must be relative location N+2.

If no definitive answer is attained after performing each of the above tests, then a sequential search from left to right is started, beginning at the relative location of the left extremity (STEP 1114). Therefore, by this process, the beginning of the left adjacent entry can be found (often times without having to resort to sequentially searching from the left extremity to the current entry).

Quit-Index

In another embodiment of the present invention, decision-bit pointers are placed in a separate data structure known as a "quit-index". A quit-index is a binary tree located within the prologue of a leaf node 3. In one embodiment of the present invention, the quit-index holds all of the decision-bit pointers required to find the decision-bits of a leaf node 3. Accordingly, decision-bit pointers are not included in any of the entries to the leaf node 3.

In the preferred embodiment of the present invention, the quit-index contains less than the total number of pointers required to find all of the decision-bits of the leaf node 3. The quit-index leads to a group of entries 101 that are sequentially searched.

As will be made clearer by the detailed description given below, providing a quit-index allows the entries to a leaf node 3 within a Q-tree to have the same format as entries to Bit-trees. Limiting the number of decision-bit pointers held in the quit-index permits more leaf node entries 101 to be supported, while making the search path to any particular entry shorter than it would have been if the entire leaf 3 had to be sequentially searched. Therefore, a balance is struck between the length of a search path through the tree, and the number of levels required in the tree (and hence the number of accesses to main storage).

Figure 11:
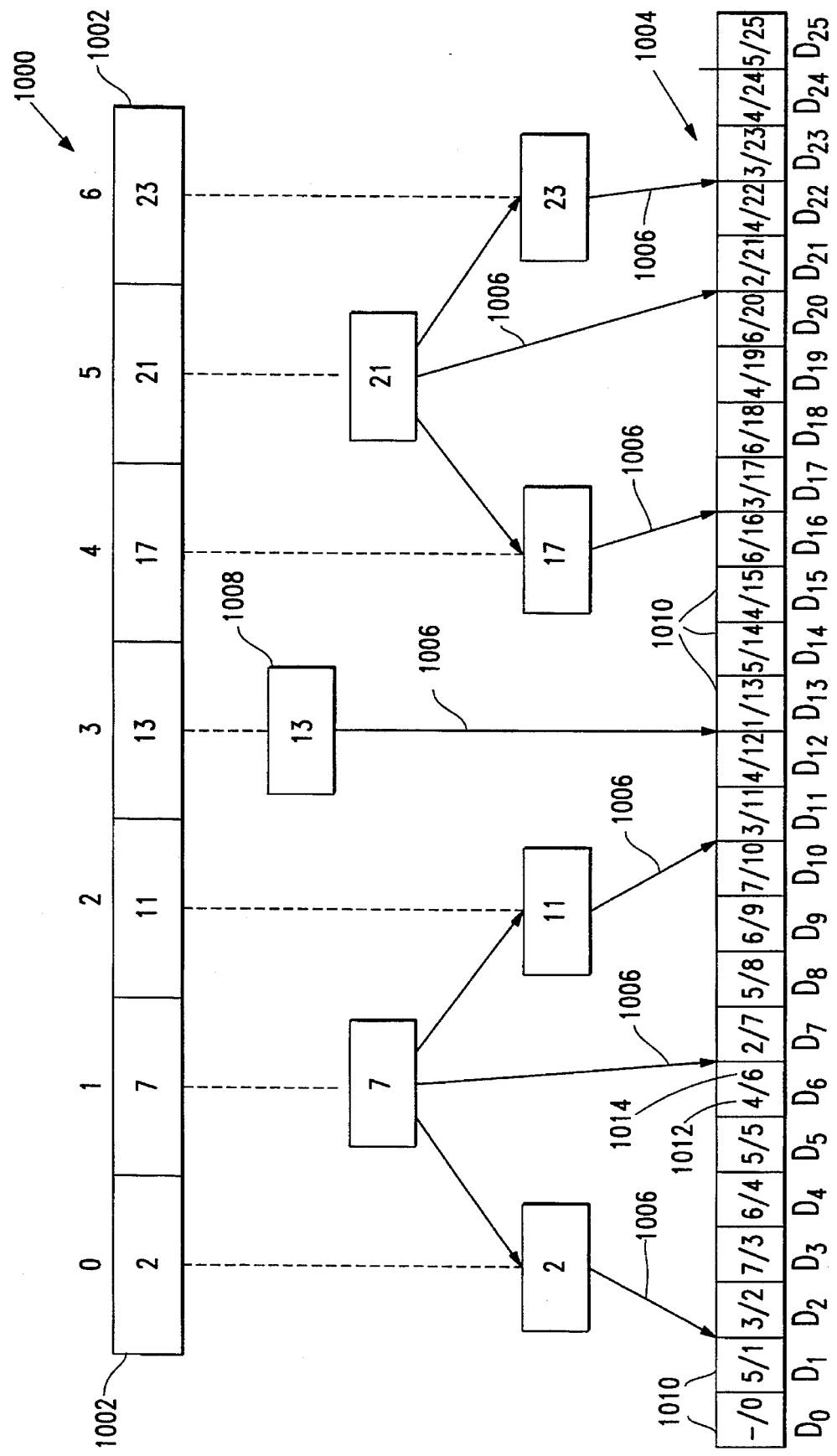
FIG. 11 is a diagram of the format of one embodiment of a quit-index in accordance with the present invention.

FIG. 11 is a diagram of the format of one embodiment of a quit-index 1000 in accordance with the present invention. The quit-index illustrated in FIG. 11 contains 7 quit-index entries 1002 at locations numbered 0–6. Each entry has only a one field. The field of each entry contains a pointer to the location of a decision-bit associated with a unique search range. Entries to the quit-index 1000 are similar to the root decision-bit pointer 401 illustrated in FIG. 4, in as much as they are located at a predetermined location within the prologue for the purpose of finding decision-bits within a leaf node body 1004. In FIG. 11, the quit-index entries 1002 are each shown twice to highlight the tree structure formed by the quit-index. An arrow 1006 associated with each entry 1002 points to the place in the leaf node body 1004 (i.e., the portion of the leaf node in which leaf node entries 1010 are maintained) at which the leaf node body 1004 is divided into subparts by the decision-bit located by the value in the associated quit-index entry 1002.

Leaf node entries 1010 each contain two fields. The first field 1012 stores a distinction-bit associated with two search keys from adjacent records. The second field 1014 stores the RRN of the record associated with larger of those two search keys. For example, as illustrated in FIG. 11, the first three leaf node entries 1010 are "l–/0l5/1l3/2l". The format of such leaf node entries 1010 is similar to the format of leaf node entries described in U.S. Pat. No. 4,677,550. Therefore the first leaf node entry 1010 has a null value in the distinction-bit field 1012 and a value of "0" in the RRN field 1014. The second leaf node entry has a value of "5" in the distinction-bit field 1012 and a value of "1" in the RRN field 1014. The third leaf node entry 1010 has a value of "3" in the distinction-bit field 1012 and a value of "2" in the RRN field 1014.

In one embodiment of the present invention using a quit-index 1000, the root entry 1008 to the quit-index 1000 is centrally located within the quit-index (in the case illustrated in FIG. 11, the quit-index root entry 1008 is located at location "3" within the quit-index). The entry associated with the decision-bit for the right subpart of the leaf node body 1004 (i.e., the right subpart of the leaf node includes those leaf node entries 1010 to the right of the arrow 1006 which descends from the quit-index root entry 1008) is located centrally among the quit-index entries to the right of the quit-index root entry 1008. Similarly, the entry associated with the decision-bit for the left subpart of the leaf node body 1004 is located centrally among the quit-index entries to the left of the quit-index root entry 1008. In the illustrated embodiment of the present invention shown in FIG. 11, each remaining quit-index entry is located either directly to the right or left of the quit-index root entry 1008, or directly to the right or left of the quit-index entry associated with the subpart to the right or left of the leaf node entry 101 0 containing the root decision-bit. Thus, each entry in the illustrated quit-index can be easily located. In an alternative embodiment of the present invention, the quit-index may contain more entries. A number of algorithms may be used to determine the location of the next quit-index entry to the left or right, since the location of each entry is predetermined and does not depend upon the number or value of the entries in the leaf node body 1004.

In cases in which the quit-index is unbalanced, those entries to the quit-index which are not used remain null values. For example, if the value of the search key having a value greater than all other search keys associated with a leaf node happens to be equal to "1000 0000" (binary), then the leaf node entry 1010 associated with that record will have a value of "1" in the distinction-bit field. Therefore, since no other leaf node entry 101 0 can have a distinction-bit of a lower value, that entry will contain the root decision-bit for that leaf node. In such a case, the quit-index root entry 1008 will point to the location of the right extremity of the leaf node. Therefore, each entry to the right of the quit-index root entry 1008 will contain null values, since there is no leaf node subpart to the right of the leaf node entry 1010 containing the root decision-bit. This would result in a less efficient search. However, there is a relatively low probability that such a situation would occur frequently.

If the quit-index 1000 of FIG. 11 had all the decision-bit pointers required to locate each "leaf" entry 101 in the leaf node 3, then the search would proceed to termination without the need to sequentially search the leaf node 3. However, the number of entries in the quit-index would be extremely burdensome.

Figure 12:
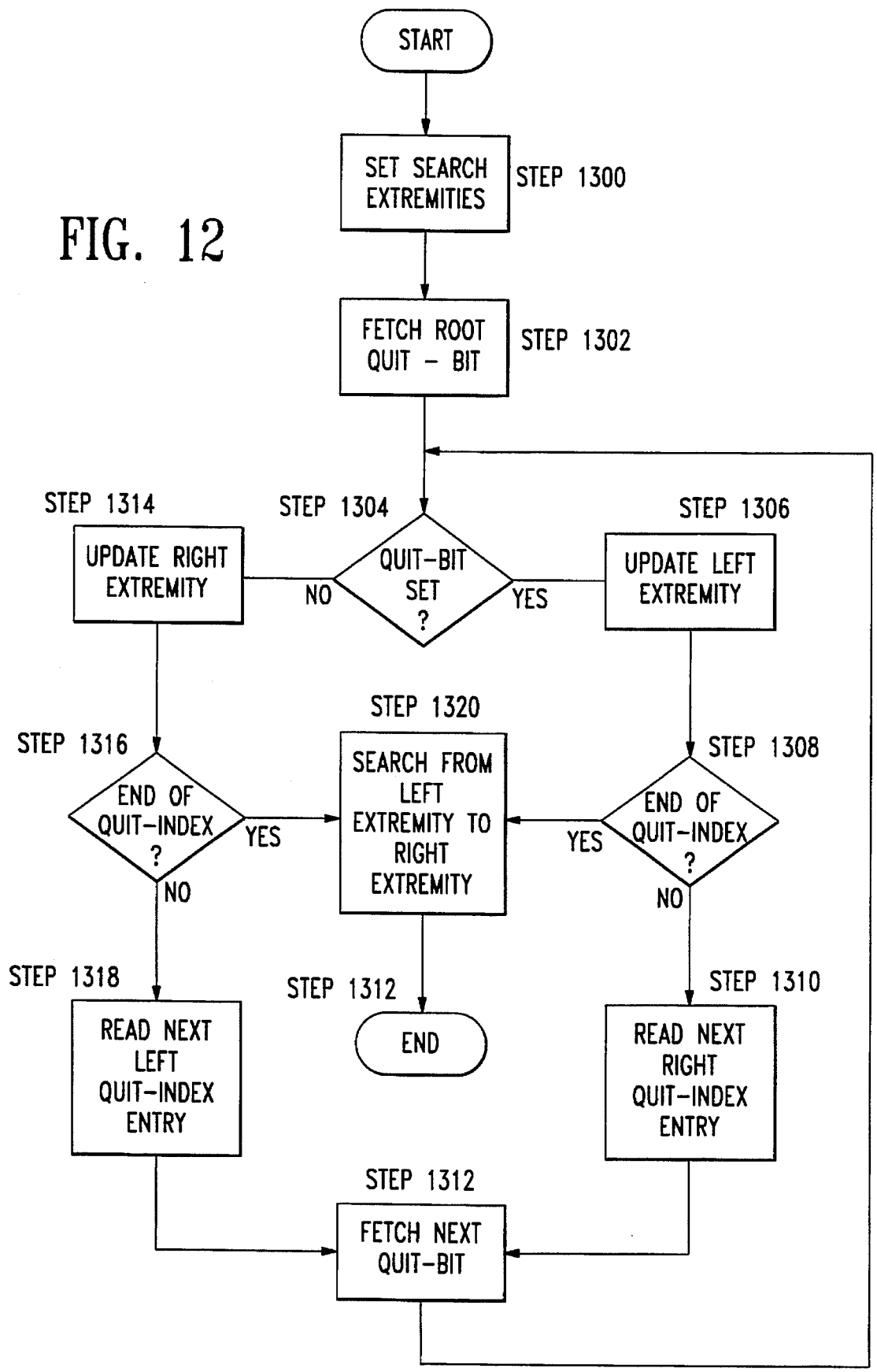
FIG. 12 is a flowchart of the steps of a search through a leaf node of a Q-tree including a quit-index in the preferred embodiment of the present invention.

FIG. 12 is a flowchart of the method for searching a Q-tree using the quit-index of FIG. 11. Initially, a variable "right extremity" is set to the location of the leaf node entry 1010 associated with the search key having greatest value, and a variable "left extremity" is set to the location of the node entry associated with the search key having the smallest value (STEP 1300). Next, the root quit-bit is located by reading the quit-index root entry 1008, and the root quit-bit is fetched (STEP 1302). The quit-bit is tested to determine whether the quit-bit is set in the SEARCH KEY (equal to a logical "1" in the preferred embodiment using positive logic) (STEP 1304). If the quit-bit is set, then the value of the left extremity is updated with the location of the leaf node entry 1010 located by the last read quit-index entry (STEP 1306). If there is a quit-index entry 1002 associated with the new search range defined between the left and right extremities (STEP 1308), then that quit-index entry 1002 is read to determine the location of the next quit-bit (STEP 1310). The quit-bit so located is then fetched (STEP 1312). If the quit-bit is not set, then the right extremity is updated with the location of the leaf node entry 1010 located by the last read quit-index entry (STEP 1314). If there is a quit-index entry 1002 associated with the new search range defined between the left and right extremities (STEP 1316), then that quit-index entry 1002 is read to determine the location of the next quit-bit (STEP 1318). The quit-bit so located is then fetched (STEP 1312).

When the answer to either STEP 1308 or STEP 1316 is "no", then a search is performed starting at the leaf node located by the current left extremity and ending at the leaf node located by the current right extremity. In the preferred embodiment of the present invention, the search is conducted in the manner disclosed in U.S. Pat. No. 4,677,550.

Using a quit-index 1000 containing less than the total number of entries has the advantages of: (1) increasing the average speed of a search through a leaf node 3 over the average speed of a search through a leaf node 3 of a standard Bit-tree; (2) increasing the number of entries in a leaf node of the same size as a leaf node of a Q-tree in which both right and left pointers are used; and (3) allowing algorithms used with standard Bit-tree leaf nodes to be used.

A number of embodiments of the present invention have been described. Nevertheless, it will be understood that various modifications may be made without departing from the spirit and scope of the invention. Accordingly, it is to be understood that the invention is not to be limited by the specific illustrated embodiment, but only by the scope of the appended claims.

We claim:

1. A computer system including a data processor and a data storage system containing ordered data records having search keys, the data record search keys being indexed by a Q-tree, the Q-tree including at least one leaf node comprising at least one search range of ordered distinction-bits, each such distinction-bit being associated with two adjacent search keys, the leaf node also comprising a decision-bit, the decision-bit determining whether a left portion or a right portion of the search range includes the distinction bit associated with a position, relative to the ordered data records, of a particular search key.

2. In a computer system including a data processor and a data storage system containing data records, each record having at least a unique search key and a unique location, wherein the records are indexed by means of a Q-tree structure having at least one leaf node, each leaf node having a plurality of entries assigned to the leaf node, at least some of the entries having at least an associated record location reference, and a distinction-bit which in at least one of the entries is a decision-bit that locates a quit-bit in a search key, a method of operating the data processor for searching selected leaf nodes for indexing information, comprising the steps of:

(a) defining a search range within a selected leaf node;

(b) locating a root decision-bit of the selected leaf node;

(c) reading the decision-bit;

(d) reading a quit-bit of the search key being sought and testing whether the quit-bit is a first predetermined value;

(e) defining a next search comprising those entries associated with search keys having values not less than the search key associated with the entry containing the last read root decision-bit if the quit-bit is equal to the first predetermined value; and (f) defining a next search comprising those entries associated with search keys having values not greater than the search key associated with the entry containing the last read root decision-bit if the quit-bit is not equal to the first predetermined value.

3. In a computer system including a data processor and a data storage system containing data records, each record having at least a unique search key and a unique location, wherein the records are indexed by means of a bit tree structure having at least one leaf node, each leaf node having a plurality of entries assigned to the leaf node, at least some of the entries having at least a right decision-bit pointer, a left decision-bit pointer, an associated record location reference, and a distinction-bit which in at least some of the entries is decision-bit that locates a quit-bit in a search key, the leaf node further including a prologue having a pointer to a first decision-bit and the location of the first and last distinction-bits of the leaf node, a method of operating the data processor for searching selected leaf nodes for indexing information, comprising the steps of:

(a) defining a search range having a left extremity and a right extremity within a selected leaf node;

(b) reading a pointer to the root decision-bit of the selected leaf node;

(c) reading the decision-bit at the location indicated by the pointer;

(d) reading a quit-bit of the search key indicated by the last read decision bit and testing whether the quit-bit is set;

(e) if the quit-bit is set, then reading a right decision-bit pointer from the entry containing the last read decision-bit to determine the location of a next decision-bit, otherwise skipping to step (j);

(f) comparing the last read right decision-bit pointer with the right extremity of the search range;

(g) if the last read right decision-bit pointer is less than the right extremity of the current search range, then;
   (1) updating the left extremity with the address of the entry contain ing the last read decision-bit;
   (2) reading the decision-bit located by the last read right decision bit pointer; and
   (3) returning to step (d);

(h) reading the record key associated with the entry located by the right extremity;

(i) if the record key associated with the entry located by the right extremity is equal to the search key, then indicating that the record key is a match for the search key and ending the search, otherwise, skipping to (m);

(j) reading the left decision-bit pointer from the entry containing the last read decision-bit to determine the location of the next decision-bit;

(k) comparing the last read left decision-bit pointer with the left extremity of the search range;

(l) if the left decision-bit is greater than the left extremity of the current search range, then:
  (1) updating the right extremity with the location of the last read decision-bit;
  (2) reading the decision-bit located by the last read left decision-bit pointer; and
  (3) returning to step (d)

(m) reading the record key associated with the entry located by the left extremity;

(n) if the record key associated with the entry located by the left extremity is equal to the search key, then indicating that the record key is a match for the search key and ending the search;

(o) reading the record key associated with the last read decision-bit and comparing the record key with the search key;

(p) if the search key is greater than the record key, then inserting the record associated with the search key to the right of that record key and ending the search;

(q) if the search key is less than the record key, then inserting the record associated with the search key to the left of that record key and ending the search; and (r) if the search key is equal to the record key, then indicating that the record key is a match for the search key and ending the search.

4. The method of claim 3, wherein the computer system further includes a memory, further including the steps of:

(a) reading the selected leaf node from the data storage device;

(b) saving the leaf node in the memory;

(c) reading the location of the first and last distinction-bits from the prologue;

(d) saving the location of the first distinction-bit in a first variable and the location of the last distinction-bit in a second variable;

and wherein:

(e) the step of updating the left extremity of the search range with the address of the entry containing the last read decision-bit includes updating the second variable with the address of the entry containing the last read decision-bit; and (f) the step of updating the right extremity of the search range with the address of the entry containing the last read decision-bit includes updating the first variable with the location of the last read decision-bit.

5. The method of claim 4, wherein entries to the leaf node in which the right decision-bit pointer would locate a decision-bit in an adjacent entry, do not include a right decision-bit pointer, and entries to the leaf node in which the left decision-bit pointer locates a decision-bit in an adjacent entry do not include a left decision-bit pointer.

6. In a computer system comprising a data processor and a data storage system containing data records, each record having at least a unique search key and a unique location, wherein the records are indexed by means of a multi-way tree structure having at least one leaf node, each leaf node having a plurality of entries assigned to the leaf node, at least some of the entries having at least an associated record location reference, and a distinction-bit which in at least one of the entries is a decision-bit that locates a quit-bit in a search key, the leaf node further including a prologue having a left extremity field, a right extremity field, and a quit-index including a pointer associated with at least one decision-bit within the entries to the leaf node, a method of operating the data processor for searching selected leaf nodes for indexing information, comprising the steps of:

(a) reading values from a left and right extremity field and loading the read values into a left and right extremity variable respectively;

(b) reading a first entry to the quit-index from the prologue of the selected leaf node;

(c) locating the first decision-bit using the first entry to the quit-index and reading the first decision-bit;

(d) reading the quit-bit of a search key associated with a record being sought, the quit-bit of the search key being indicated by the last read decision-bit;

(e) testing whether the quit-bit is in a first logical state;

(f) if the quit-bit is in the first logical state, then updating the left extremity variable with the location of the leaf node entry containing the last read decision-bit, otherwise skipping to step (j);

(g) if the last read entry to the quit-index is not at the end of the quit-index, then reading from the quit-index the next right quit-index entry to determine the location of the next decision-bit, otherwise sequentially searching each leaf node entry starting at the location indicated by the value of one extremity variable and ending at the location indicated by the other extremity variable and ending;

(h) fetching the next decision-bit;

(i) repeating step (d);

(j) if the quit-bit is not in the first logical state, then updating the right extremity variable with the location of the leaf node entry containing the last read decision-bit;

(k) if the last read entry to the quit-index is not at the end of the quit-index, then reading from the quit-index the next left quit-index entry to determine the location of the next decision-bit, otherwise sequentially searching each leaf node entry starting at the location indicated by the value of one extremity variable and ending at the location indicated by the other extremity variable and ending;

(l) fetching the next decision-bit;

(m) repeating step (d).

7. In a computer system comprising a data processor and a data storage system containing data records, wherein the records are indexed by means of a tree structure having at least one leaf node, each leaf node having a plurality of entries assigned to the leaf node, each entry having a record location reference in the range of "1" to "x" which occupies "a" relative locations within the entry, a distinction-bit having a value greater than "y" which occupies "b" relative locations, and less than three decision-bit pointers, each of which occupy "c" relative locations, the first relative location of each decision-bit pointer having a value not greater than "z", where "z" is not less than "y", a method for locating the relative location of the beginning of an entry to the left of, and adjacent to, an entry that begins at a known relative location "N+8", including the steps of:

(a) comparing the value stored at relative location N+4 to "z";

(b) comparing the value stored at relative location N+through N+5 to "x", if the value at N+4 is not less than "z", otherwise going to step (e);

(c) searching sequentially from left to right starting at left extremity of the search range for the relative location of the beginning of each entry until the beginning of the entry to the left of, and adjacent to the entry beginning at relative location "N+8" is found, if the value stored at relative location N+through N+5 is not greater than "x", otherwise;

(d) determining that the relative location of the entry to the left of, and adjacent to, the entry beginning at relative location "N+8" is "N+4";

(e) comparing the value stored at relative location N+through N+5 to "x", if the value at N+4 is less than "z";

(f) determining that the relative location of the entry to the left of, and adjacent to, the entry beginning at relative location "N+8" is "N", otherwise;

(g) comparing the value stored at relative location N+2 to "y";

(h) determining that the relative location of the entry to the left of, and adjacent to, the entry beginning at relative location "N+8" is "N", otherwise;

(i) comparing the value stored at relative location N+2 to the value stored at relative location N+8;

(j) determining that the relative location of the entry to the left of, and adjacent to, the entry beginning at relative location "N+8" is "N", otherwise;

(k) comparing the value stored at relative location N+1 through N+to "x";

(l) determining that the relative location of the entry to the left of, and adjacent to, the entry beginning at relative location "N+8" is "N+2", otherwise performing step (c).

8. The method of claim 7, wherein the value of "x" is equal to the number of records stored in the data storage device, the value of "y" is equal to "8", and "z" is equal to "7".

* * * * *